US010833573B1

(12) United States Patent
Booen et al.

(10) Patent No.: US 10,833,573 B1
(45) Date of Patent: Nov. 10, 2020

(54) APPARATUSES, SYSTEMS, AND METHODS FOR LORENTZ-FORCE-BASED MOVEMENT

(71) Applicant: Facebook, Inc., Menlo Park, CA (US)

(72) Inventors: Eric Booen, Thousand Oaks, CA (US); William Hamlin Farr, Dublin, CA (US); Chiyun Xia, Agroura Hills, CA (US); Alex Chong, San Jose, CA (US)

(73) Assignee: Facebook, Inc., Menlo Park, CA (US)

( * ) Notice: Subject to any disclaimer, the term of this patent is extended or adjusted under 35 U.S.C. 154(b) by 549 days.

(21) Appl. No.: 15/940,019

(22) Filed: Mar. 29, 2018

(51) Int. Cl.
| | |
|---|---|
| *H02K 41/035* | (2006.01) |
| *H02K 41/03* | (2006.01) |
| *H02N 15/00* | (2006.01) |
| *H02K 11/21* | (2016.01) |
| *H02K 11/33* | (2016.01) |
| *H04B 10/112* | (2013.01) |
| *B64G 1/22* | (2006.01) |

(52) U.S. Cl.
CPC ......... *H02K 41/0358* (2013.01); *H02K 11/21* (2016.01); *H02K 11/33* (2016.01); *H02N 15/00* (2013.01); *B64G 1/22* (2013.01); *H04B 10/1123* (2013.01)

(58) Field of Classification Search
CPC .. H02K 41/0358; H02K 41/031; H02K 11/21; H02K 11/33; H02N 15/00; B64G 1/22; H04B 10/1123
See application file for complete search history.

(56) References Cited

U.S. PATENT DOCUMENTS

| 5,610,750 A | 3/1997 | Popescu et al. |
| 6,664,666 B2 * | 12/2003 | Corcoran ............... G05G 9/047 310/12.23 |
| 8,497,767 B2 | 7/2013 | Hollis, Jr. |

OTHER PUBLICATIONS

Berkelman et al., "Actuation Model for Control of a Long Range Lorentz Force Magnetic Levitation Device", Proceedings of the IEEE International Conference on Intelligent Robots and Systems, Nov. 2010, 7 pages.
"Magic Wrist", Microdynamic Systems Laboratory, The Robotics Institute at Carnegie Mellon University, Jan. 7, 2005, 2 pages.
Berkelman, Peter, "Tool-Based Haptic Interaction with Dynamic Physical Simulations Using Lorentz Magnetic Levitation", Johns Hopkins University, Jan. 2000, pp. 1-21.
(Continued)

*Primary Examiner* — Mohamad A Musleh
(74) *Attorney, Agent, or Firm* — FisherBroyles, LLP

(57) ABSTRACT

The disclosed apparatus may include (1) a subassembly including (a) a first conductive coil, where at least a portion of the first coil defines a portion of a spherical surface and is oriented along a first direction along the portion of the spherical surface, (b) a second conductive coil proximate the first coil, where at least a portion of the second coil is oriented along a second direction orthogonal to the first direction along the portion of the spherical surface, and (c) a body that holds the coils, (2) a structure that generates a magnetic field through the portion of the first and second coils along a third direction orthogonal to the first and second directions, and (3) a coil driver circuit that supplies current to the coils to move the structure relative to the subassembly, or vice-versa, along the first and second directions. Various other embodiments are also disclosed.

20 Claims, 13 Drawing Sheets

(56) References Cited

OTHER PUBLICATIONS

Salcudean et al., "6-DOF Desk-Top Voice-Coil Joystick", Department of Electrical and Computer Engineering, University of British Columbia, Vancouver, BC, V6T 1Z4, Canada, 1997, 7 pages.
Wong, Ngai Mun, "Implementation of a Force-Reftecting Telerobotic System with Magnetically Levitated Master and Wrist", Department of Electrical Engineering, University of British Columbia, Dec. 1992, 122 pages.
Tufail, Muhammad, "Haptic Teleoperation with Impedance Control Based on Learned Inverse Dynamics with Application in Homecare Robotics", University of British Columbia, Vancouver, Dec. 2015, 176 pages.
Xia et al., "Systems and Methods for Controlling a Lorentz-Force-Based Apparatus", U.S. Appl. No. 16/138,263, filed Sep. 21, 2018, 86 pages.
Notice of Allowance received for U.S. Appl. No. 16/138,358 dated Jan. 15, 2020, 23 pages.
"Advanced Technology for Isolating Payloads in Microgravity," Dean C. Alhorn, NASA Marshall Space Flight Center, retrieved from <https://ntrs.nasa.gov/archive/nasa/casi.ntrs.nasa.gov/20010000366.pdf> on Mar. 28, 2018.
"Payload Isolation for Microgravity Research," Green et al., Controlled Dynamics Inc., Huntington Beach, CA., accessed from <https://flightopportunities.nasa.gov/media/technology/78/77-s_poster_asgsr2013.pdf> on Feb. 28, 2018.
"Using Magnetic Levitation for Haptic Interaction," Peter Berkelman et al., Univ. of Hawai'i at Manoa (Jun. 1, 2014).

* cited by examiner

APPARATUSES, SYSTEMS, AND METHODS FOR LORENTZ-FORCE-BASED MOVEMENT

BACKGROUND

In some spacecraft, a corresponding payload may be required to maintain a line-of-sight (LOS) to a destination point for the payload to be fully operational (e.g., to maintain a communication link between a pair of communication terminals). Such a system may be employed in a vehicle residing in earth orbit, such as a geostationary earth orbit (GEO), but may also be employed in other applications as well. One particular type of communication system that typically relies on an LOS communication link is an optical (e.g., laser) communication system that employs a highly collimated laser beam with only a few microradians of divergence and approximately 30 centimeters (cm) in width. In some situations, maintaining LOS with such a beam may involve the use on the vehicle of one or more large mirrors approximately 45 cm wide for deflecting and steering the beam. Given the extensive distances involved in such communication, steering accuracy in the microradian and nanoradian range is generally required for such a beam.

Complicating the ability of a vehicle to steer a communication beam with such accuracy are the vibration and other dynamics of the vehicle itself, as minor physical disturbances may be sufficient to disrupt LOS. To mitigate these disturbances, the communication payload, including the mirror noted above, is often carried on a vibration-dampening platform to mechanically buffer the payload from the spacecraft. Typically, such platforms are custom-designed for each particular application, taking into account various characteristics of the vehicle (e.g., vibration profile) and the payload (e.g., mass, volume, communication link budget, and so on).

SUMMARY

As will be described in greater detail below, the instant disclosure describes apparatuses, systems, and methods for Lorentz-force-based movement (e.g., for LOS pointing). In one example, an apparatus may include (1) a subassembly that may include (a) a first conductive coil, where at least a portion of the first conductive coil defines a portion of a spherical surface, and where the portion of the first conductive coil is oriented along a first direction along the portion of the spherical surface, (b) a second conductive coil proximate the first conductive coil, where at least a portion of the second conductive coil is oriented along a second direction along the portion of the spherical surface, and where the second direction is orthogonal to the first direction, and (c) a body that holds the first conductive coil and the second conductive coil, (2) a magnetic field generation structure that generates a magnetic field through the portion of the first conductive coil and the portion of the second conductive coil, where the magnetic field is directed along a third direction orthogonal to the first direction and the second direction, and (3) a coil driver circuit that (a) supplies first current to the first conductive coil to move the magnetic field generation structure along the second direction relative to the subassembly and supplies second current to the second conductive coil to move the magnetic field generation structure along the first direction relative to the subassembly, or (b) supplies first current to the first conductive coil to move the subassembly along the second direction relative to the magnetic field generation structure and supplies second current to the second conductive coil to move the subassembly along the first direction relative to the magnetic field generation structure.

In some embodiments, the body may include a section defining the portion of the spherical surface, and the first conductive coil may be at least partially routed over the section on an exterior of the body. In some examples, the second conductive coil may be routed over the section on an interior of the body. Moreover, in some embodiments, the subassembly may further include a third conductive coil that is routed over the section at the exterior of the body, and at least a portion of the third conductive coil may be oriented along the second direction. Also in some examples, the second conductive coil and the third conductive coil may each define a central open area, the second conductive coil may at least partially overlap the central open area of the third conductive coil, and the third conductive coil may at least partially overlap the central open area of the second conductive coil. Additionally, in some embodiments, the subassembly may further include a fourth conductive coil that is routed over the section at the exterior of the body, may be located proximate the third conductive coil, and may define a central open area, where the second conductive coil at least partially overlaps the central open area of the fourth conductive coil, and where the fourth conductive coil at least partially overlaps the central open area of the second conductive coil.

In some examples, the subassembly may include a third conductive coil proximate the second conductive coil, where the third conductive coil is routed over the section on the interior of the body, and where at least a portion of the third conductive coil is oriented along the second direction.

In some embodiments, the second conductive coil may be routed over the section at the exterior of the body over the first conductive coil. In addition, in some examples, the subassembly may further include a separator that includes a contour matching the section of the body, where the separator is coupled to the body over the first conductive coil, and where the second conductive coil is routed atop the separator opposite the first conductive coil. Moreover, in some embodiments, the subassembly may also include a third conductive coil proximate the second conductive coil, where the third conductive coil is routed over the section at the exterior of the body over the first conductive coil, and where at least a portion of the third conductive coil is oriented along the second direction.

In some examples, the magnetic field generation structure may include (1) a first magnet located proximate the section of the body external to the body, and (2) a second magnet located proximate the section of the body internal to the body. Moreover, in some embodiments, the magnetic field generation structure may further include a flux carrier carrying the first magnet and the second magnet, where the flux carrier surrounds the section of the body.

In an example, a system may include (1) a plurality of subassemblies, where each subassembly may include (a) a first conductive coil, where at least a portion of the first conductive coil defines a portion of a spherical surface, and where the portion of the first conductive coil is oriented along a first direction along the portion of the spherical surface, (b) a second conductive coil proximate the first conductive coil, where at least a portion of the second conductive coil is oriented along a second direction along the portion of the spherical surface, and where the second direction is orthogonal to the first direction, and (c) a body that holds the first conductive coil and the second conductive coil, (2) for each subassembly, a magnetic field generation structure that generates a magnetic field through the portion of the first conductive coil and the portion of the second conductive coil, where the magnetic field is directed along a third direction orthogonal to the first direction and the second direction, (3) a stator assembly including a base and (a) the plurality of subassemblies, where the body of each of the plurality of subassemblies is connected to the base, or (b) the magnetic field generation structures, where each of the magnetic field generation structures is connected to the base, (4) a rotor assembly including (a) the plurality of subassemblies, where the body of each of the plurality of subassemblies is connected to the platform, or (b) the magnetic field generations structures, where each of the magnetic field generation structures is connected to the platform, and (5) a coil driver circuit that, for each subassembly, (a) supplies first current to the first conductive coil to move a corresponding magnetic field generation structure along the second direction relative to the subassembly and supplies second current to the second conductive coil to move the corresponding magnetic field generation structure along the first direction relative to the subassembly, or (b) supplies first current to the first conductive coil to move the subassembly along the second direction relative to a corresponding magnetic field generation structure and supplies second current to the second conductive coil to move the subassembly along the first direction relative to the corresponding magnetic field generation structure. In some embodiments, at least one of the magnetic field generation structures or the plurality of subassemblies may be positioned equidistant about the platform. The system, in some examples, may include three of the magnetic field generation structures and three of the magnetic field generation structures. The system may also include, in some embodiments, (1) at least one position sensor that generates position information that indicates a position of the platform relative to the stator assembly, and (2) a control subsystem that causes the coil driver circuit to supply at least one of the first current or the second current for at least one of the plurality of subassemblies based on the position information. Moreover, in some embodiments, the control subsystem may cause the coil driver circuit to supply the at least one of the first current or the second current for the at least one of the plurality of subassemblies to maintain an orientation of the platform toward a reference area independent of an orientation of the stator assembly.

In some examples, the system may also include a payload connected to the platform. Moreover, the payload may include a communication device, in some embodiments.

In one example, a method may include (1) providing a subassembly that may include (a) a first conductive coil, where at least a portion of the first conductive coil defines a portion of a spherical surface, and where the portion of the first conductive coil is oriented along a first direction along the portion of the spherical surface, (b) a second conductive coil proximate the first conductive coil, where at least a portion of the second conductive coil is oriented along a second direction along the portion of the spherical surface, and where the second direction is orthogonal to the first direction, and (c) a body that holds the first conductive coil and the second conductive coil, (2) generating, using a magnetic field generation structure, a magnetic field through the portion of the first conductive coil and the portion of the second conductive coil, where the magnetic field is directed along a third direction orthogonal to the first direction and the second direction, (3) supplying a first current to the first conductive coil (a) to move the magnetic field generation structure along the second direction relative to the subassembly, or (b) to move the subassembly along the second direction relative to the magnetic field generation structure, and (4) supplying a second current to the second conductive coil (a) to move the magnetic field generation structure along the first direction relative to the subassembly, or (b) to move the subassembly along the first direction relative to the magnetic field generation structure.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
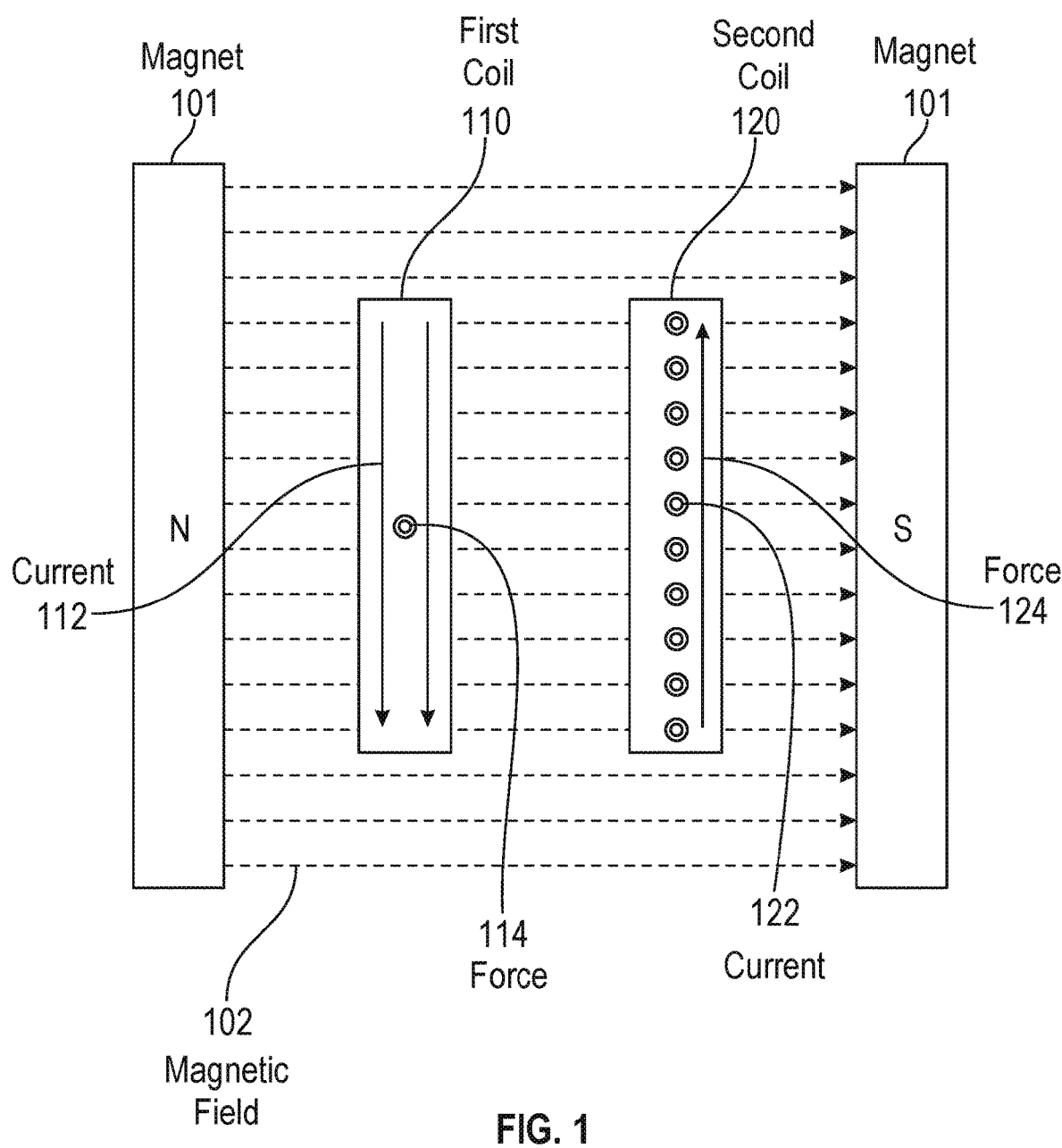
FIG. 1 is a graphical representation of an exemplary high-level structure for employing the Lorentz force for movement purposes.
Figure 2:
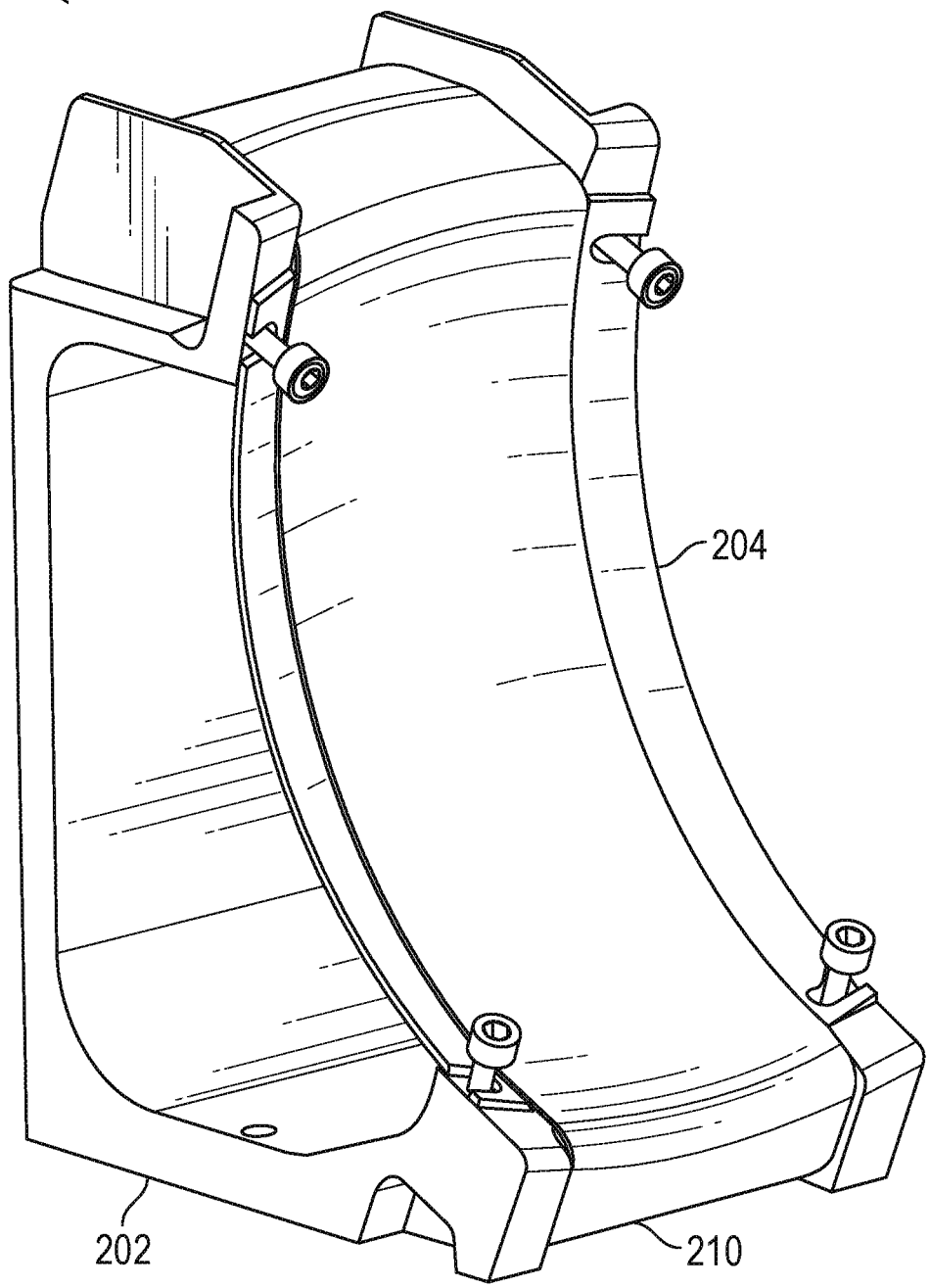
FIG. 2 is a perspective view of a partial exemplary coil subassembly for employing the Lorentz force for orientation purposes.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to apparatuses, systems, and methods for movement (e.g., orientation and/or translation) by employing the Lorentz force. As will be explained in greater detail below, embodiments of the instant disclosure may facilitate an orientation system (e.g., for a communication system carried on a space vehicle) that physically isolates a platform and/or payload coupled to the orientation system (e.g., via levitation) from vibrations or other unwanted movements of the vehicle. Moreover, some examples of the orientation system may facilitate movement of a platform and/or payload about at least two axes (e.g., pitch and yaw) relative to the vehicle. Other embodiments employing similar concepts may provide translation and/or orientation, up to six degrees of freedom.

Figure 5:
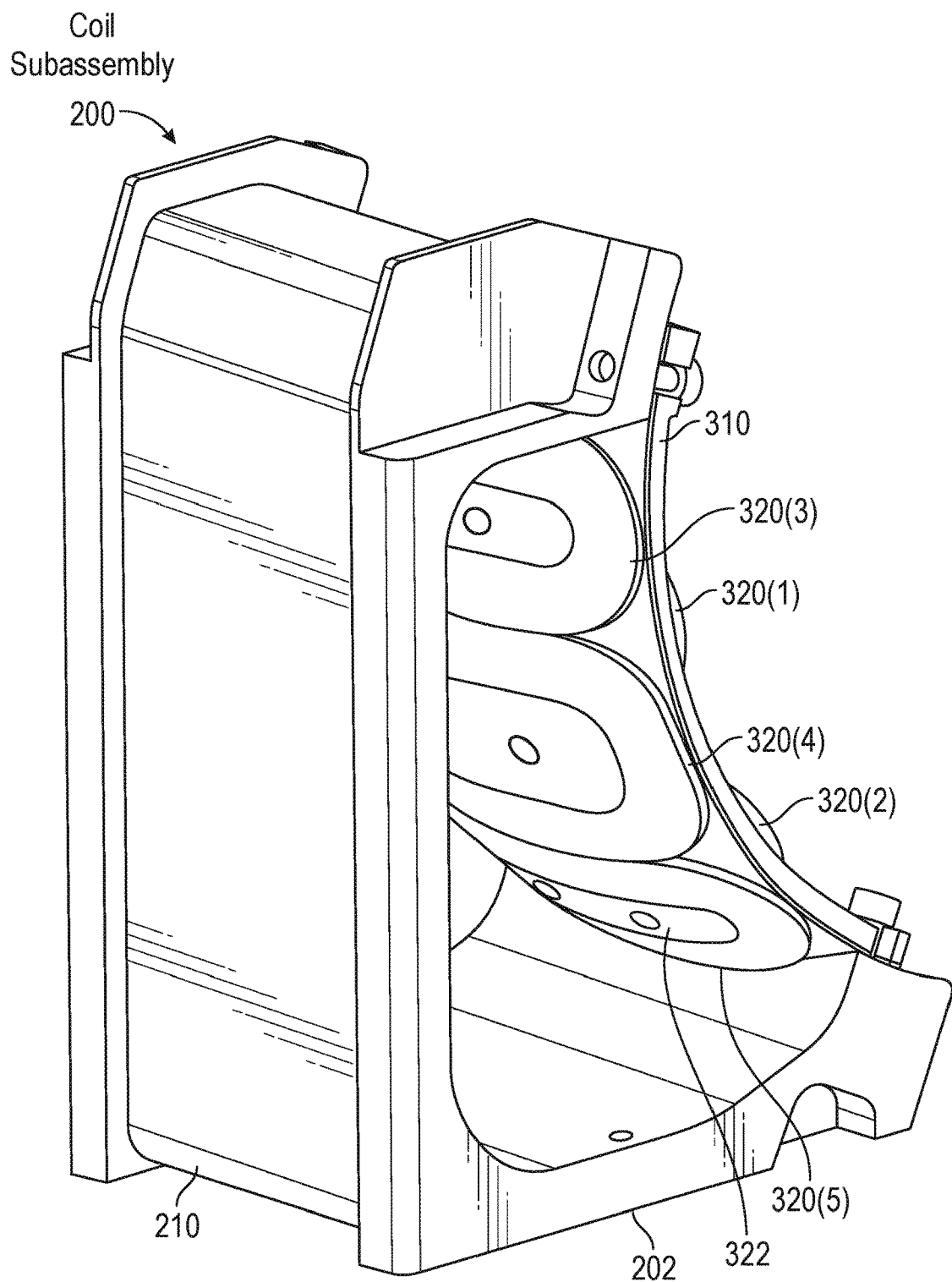
FIG. 5 is a back perspective view of the exemplary coil subassembly of FIG. 2.
Figure 6:
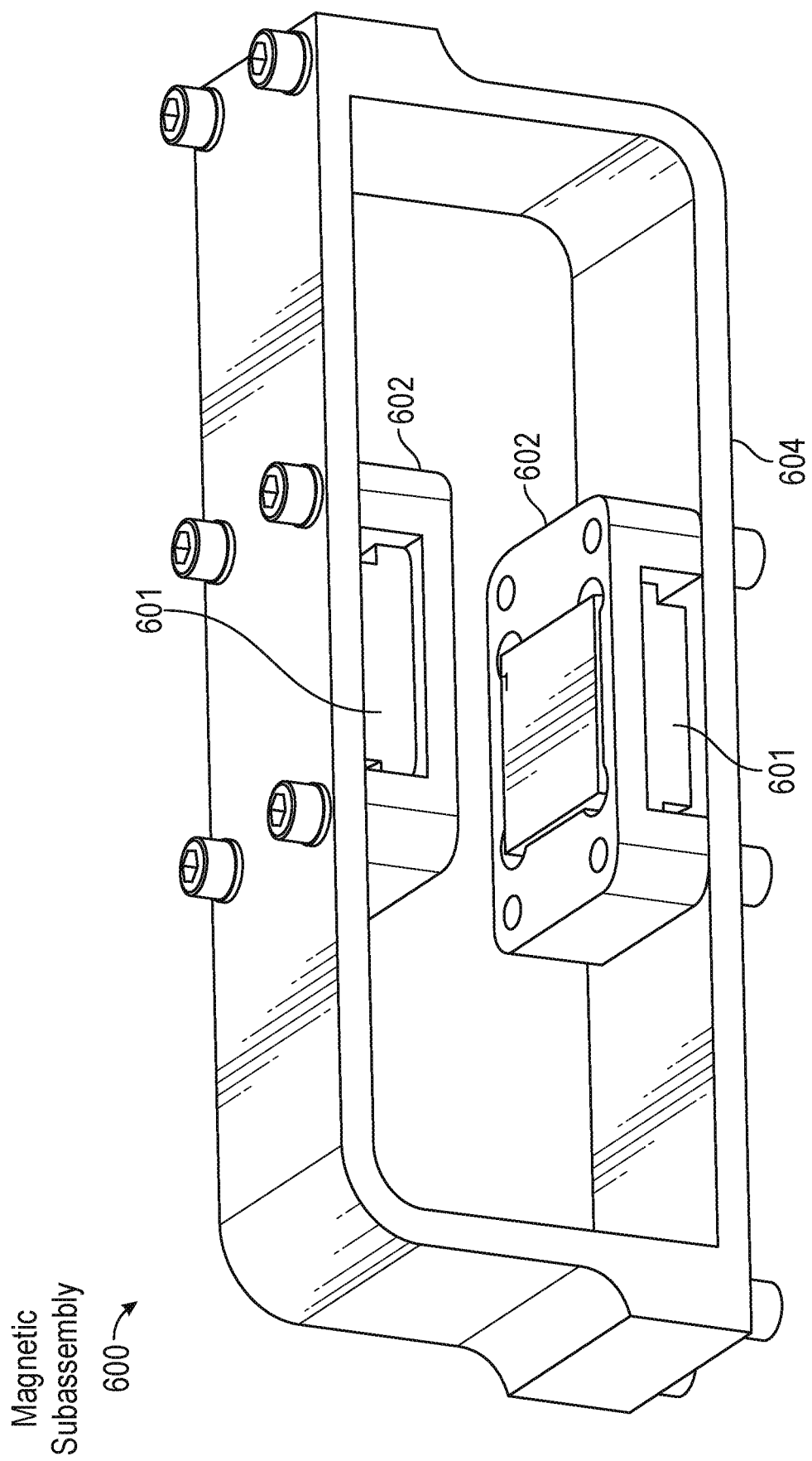
FIG. 6 is a perspective view of an exemplary magnet subassembly for employing the Lorentz force for orientation purposes.
Figure 7:
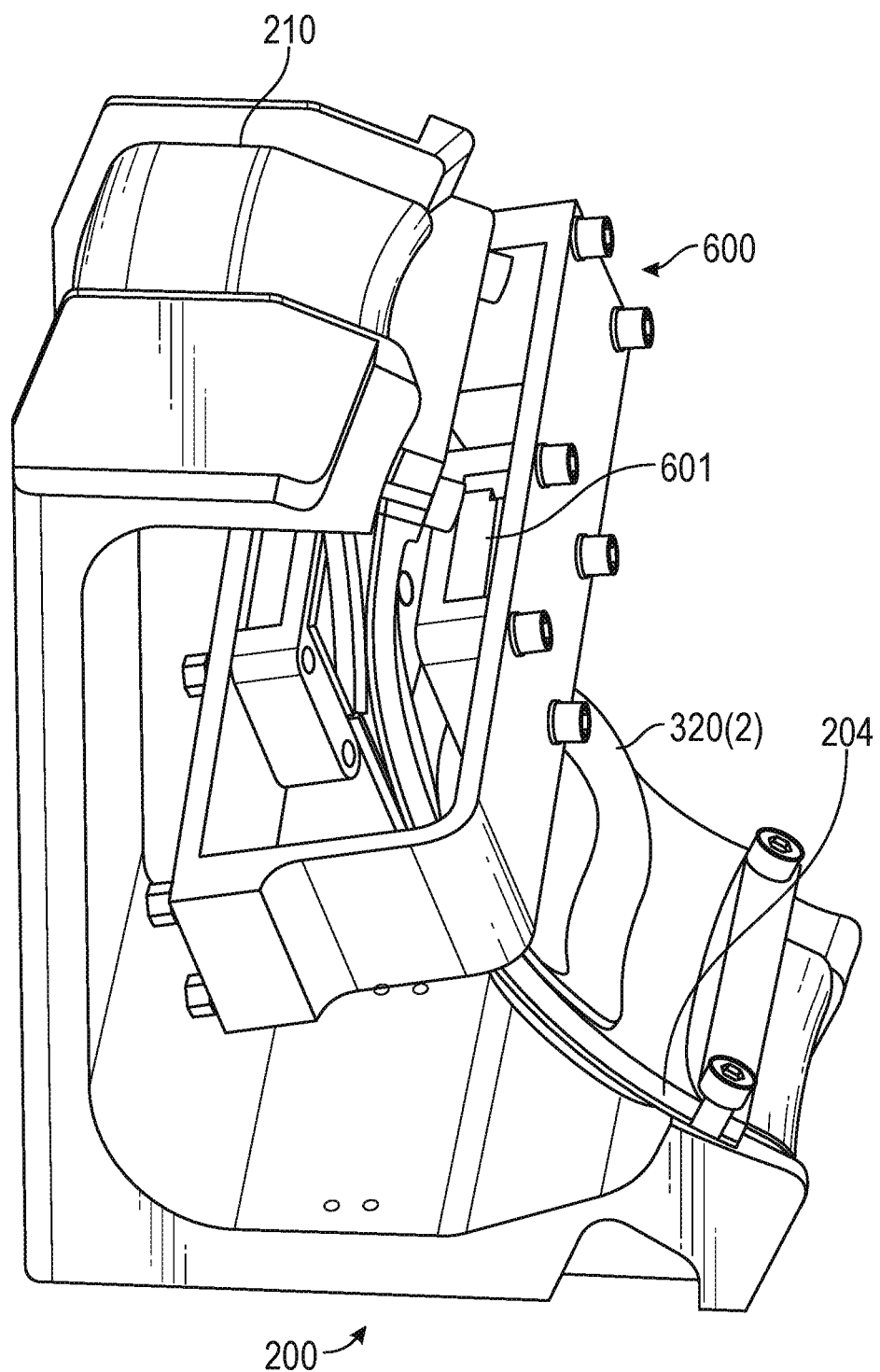
FIG. 7 is a perspective view of an exemplary combination of the exemplary coil subassembly of FIG. 2 and the exemplary magnet subassembly of FIG. 6.

The following will provide, with reference to FIGS. 1-12, detailed descriptions of apparatuses, systems, and methods of movement that employ the Lorentz force. An overall description of the use of the Lorentz force in various embodiments presented herein is provided in conjunction with FIG. 1. A discussion of an exemplary coil subassembly employing the Lorentz force is provided in connection with FIGS. 2-5. A corresponding exemplary magnet subassembly for use with the exemplary coil subassembly is presented in reference to FIG. 6. A combination of the exemplary magnet subassembly and the exemplary coil subassembly, as depicted in FIG. 7, is discussed below as well. In connection with FIGS. 8 and 9, an exemplary levitating platform employing multiple coil/magnet subassemblies is described. The following further includes a description in conjunction with FIG. 10 of an exemplary system including the exemplary levitating platform depicted in FIGS. 8 and 9. In relation to FIG. 11, a discussion of an exemplary method of employing the Lorentz force using the exemplary coil subassembly is presented. In addition, with reference to FIG. 12, a discussion is provided of an exemplary control loop for operating the exemplary levitating platform of FIGS. 8 and 9 within the exemplary system of FIG. 10. Moreover, a description of an exemplary control example employing coils of the exemplary coil subassembly introduced above is provided in conjunction with FIG. 13.

In the following detailed description, references are made to various directions or orientations (e.g., upper, lower, vertical, horizontal, roll, pitch, yaw, elevation, azimuth, and the like). These references are provided for convenience in describing various aspects of the embodiments and examples presented below, and are not intended to limit the orientation of exemplary embodiments discussed herein. While the various embodiments of the exemplary assemblies and subassemblies are presented in connection with a horizontally oriented platform, other orientations of the various embodiments are also possible.

Moreover, while various embodiments are described below in conjunction with a space vehicle, the examples described herein are not limited to such an environment, but may be employed in locations exposed to greater levels of gravitational force, including, but not limited to, a terrestrial surface. In addition, while some examples described below particularly note the use of optical communications devices or systems as potential payloads for the exemplary levitating platforms described hereafter, other types of payloads or devices (e.g., high-resolution imagers, high-frequency (e.g., radio-frequency (RF)) devices, medical devices, haptic devices, and so on) may also benefit from the orientation and/or translation capabilities associated with the levitating platforms.

FIG. 1 is a graphical representation of an exemplary high-level structure 100 for employing the Lorentz force for movement purposes, such as for orientation and/or translation. Included in structure 100 are two magnets 101 of opposing polarity that generate a magnetic field 102 in a volume in which at least a portion of a first conductive coil 110 and a second conductive coil 120 are located. In some examples, the corresponding portions of first conductive coil 110 and second conductive coil 120 residing between magnets 101 in magnetic field 102 may be oriented orthogonally or perpendicularly to each other and the magnetic field 102. Corresponding to these orientations, in the particular example of FIG. 1, first conductive coil 110 is shown with an electrical current 112 flowing downward along the drawing (e.g., toward the bottom of the page), and second conductive coil 120 is depicted with an electrical current 122 flowing out of the drawing (e.g., toward the reader).

The Lorentz force for a linear conductor (e.g., a portion of a single wire of first conductive coil 110 or second conductive coil 120) may be defined as the cross-product of a vector describing the current carried in the length of the single wire and the vector indicating the magnetic field. In other words, F=(I*wire)×B, where F is the vector of the Lorentz force on the wire, I is the magnitude of the electrical current, wire is the vector indicating the length of the wire in the magnetic field and the direction of the current in the wire, and B is the magnetic field vector. According to the right-hand rule, based on the direction of currents 112 and 122 and the magnetic field 102, first conductive coil 110 may experience a Lorentz force 114 relative to magnets 101 that is directed out of the drawing (e.g., toward the reader) and second conductive coil 120 may encounter a Lorentz force 124 relative to magnets 101 that is directed upward along the drawing (e.g. toward the top of the page). Additionally, in some examples, current 112 and/or 122 may be reversed, thus causing directly opposing Lorentz forces 114 and/or 124.

In various embodiments described below, instead of moving first conductive coil 110 and second conductive coil 120 relative to magnets 101 (e.g., viewing magnets 101 as defining a reference frame), the Lorentz force applied to portions of first conductive coil 110 and second conductive coil 120 may cause a subassembly that includes magnets 101 (as well as a platform connected thereto) to move relative to first conductive coil 110 and second conductive coil 120 (e.g., viewing first conductive coil 110 and second conductive coil 120 as defining the reference frame). In some examples, such as those presented below, multiple such arrangements may be used to provide rotational and/or translational movement of such a platform. In other embodiments, a platform may be mechanically coupled to first conductive coil 110 and second conductive coil 120 so that current in first conductive coil 110 and second conductive coil 120 may cause the platform to rotate and/or translate relative to magnets 101.

FIGS. 2-5 are perspective views of an exemplary coil subassembly 200 for employing the Lorentz force for orientation purposes. In some embodiments, as shown to best effect in FIG. 2, a first conductive coil 210 (e.g., including a plurality of turns of conductive wire) is wrapped about an electrically nonconductive body 202 (e.g., plastic, polymer, anodized aluminum, or the like) that includes a contour 204 that defines a portion of a spherical surface. In some embodiments, electrically nonconductive body 202 may be thermally conductive to sink heat from first conductive coil 210, as well as other conductive coils described below. In the particular example of FIGS. 2-5, contour 204 may be a separate portion of material that is screwed, bolted, or otherwise affixed to a remainder of body 202. Additional, in some embodiments, first conductive coil 210 may be generally oriented along a first direction (e.g., vertically from the perspective of the reader), resulting in the portion of first conductive coil 210 at contour 204 being generally oriented vertically and defining the portion of the spherical surface at contour 204.

Figure 3:
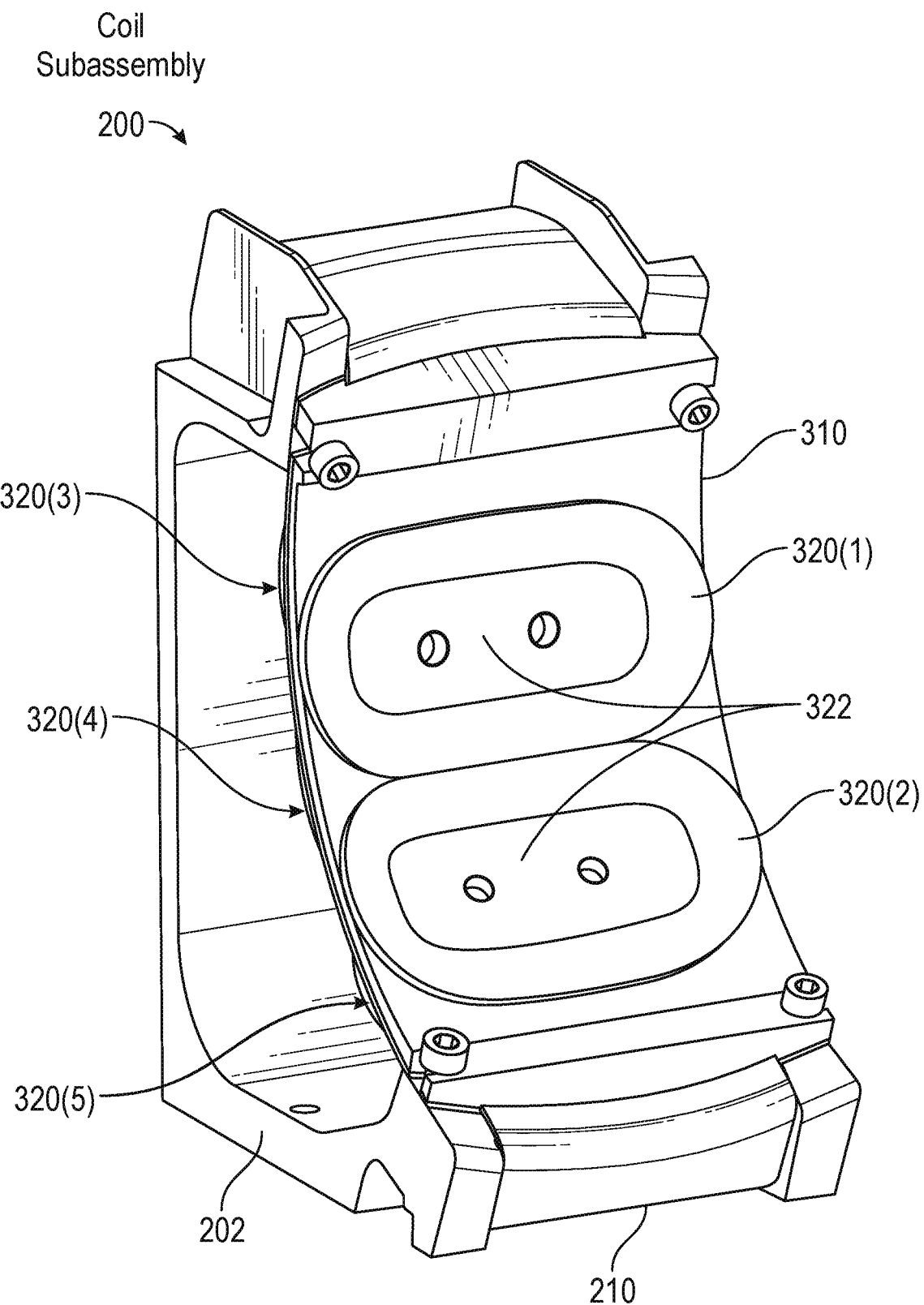
FIG. 3 is a perspective view of a more complete version of the exemplary coil subassembly of FIG. 1.
Figure 4:
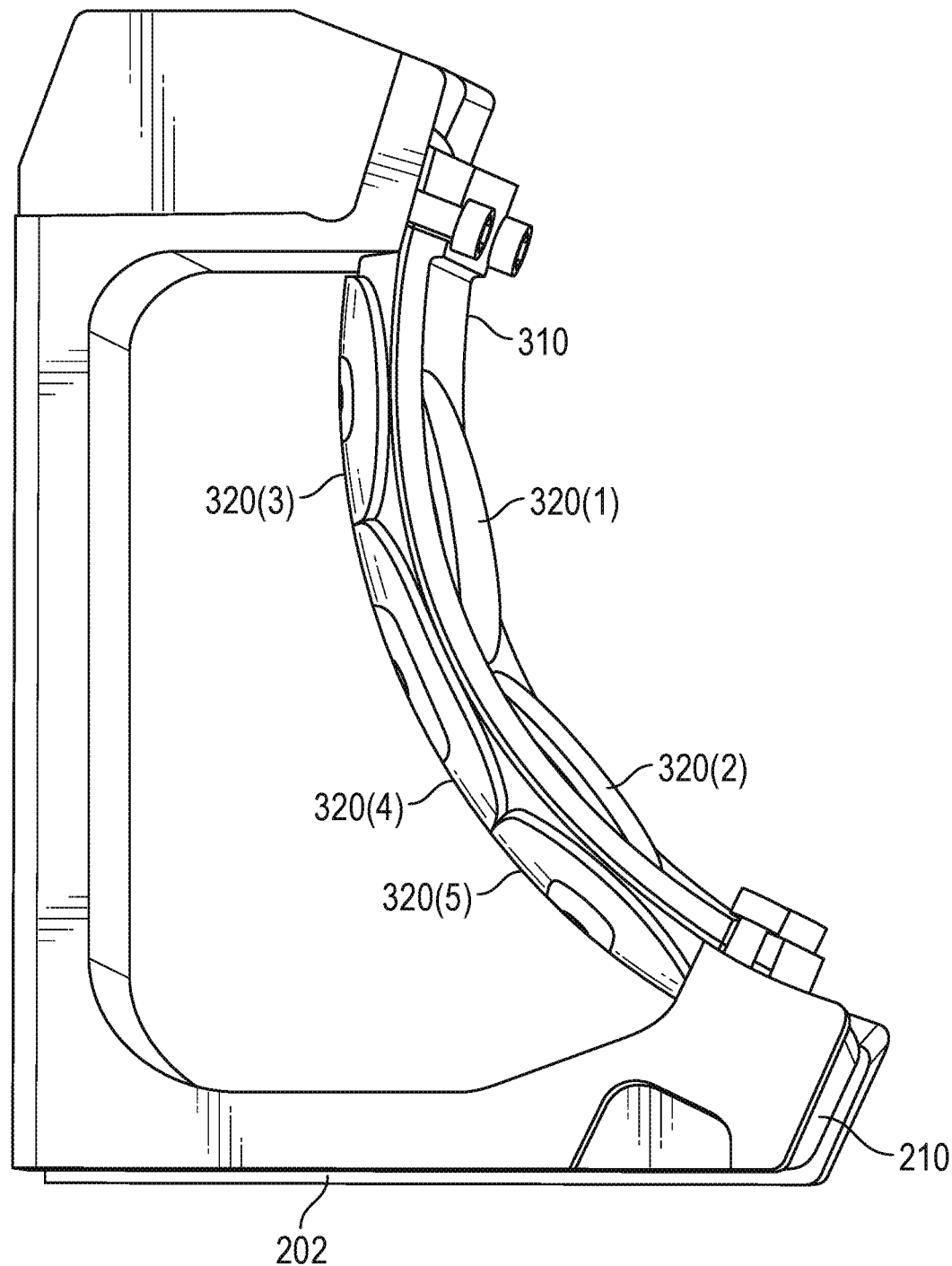
FIG. 4 is another perspective view of the exemplary coil subassembly of FIG. 2.

In addition, as shown in FIGS. 3-5, coil subassembly 200 may also include a plurality of second conductive coils 320(1) through 320(5) (collectively, second conductive coils 320). However, in other examples, one or more second conductive coils 320 may be employed. As indicated, at least a portion of each of second conductive coils 320 may be routed along the spherical surface defined by first conductive coil 210 and contour 204. In the particular example of FIGS. 3-5, three second conductive coils 320 (e.g., second conductive coils 320(3), 320(4), and 320(5)) are positioned and routed along an interior of the body 202 along the portion of the spherical surface. In some embodiments, the three second conductive coils 320(3), 320(4), and 320(5) are wound onto the section of body 202 defining the portion of the spherical surface (e.g., contour 204), opposite first conductive coil 210. Additionally, the remaining two second conductive coils 320(1) and 320(2) may be routed over the portion of the spherical surface at an exterior of body 202. Further, in some examples, a long dimension of each of second conductive coils 320 may be oriented along a second direction (e.g., horizontally from the perspective of the reader).

In some examples, an electrically nonconductive separator 310 may be affixed to body 202 over first conductive coil 210. Also, in some embodiments, separator 310 may include a spool 322 or other feature about which each of second conductive coils 320(1) and 320(2) may be wound. Second conductive coils 320(3), 320(4), and 320(5) may be wound about similar spools 322 or other features to route second conductive coils 320(3), 320(4), and 320(5) over the portion of the spherical surface of contour 204.

Also, as illustrated in FIGS. 3-5, each second conductive coil 320 may define a central open area as a result being wound around spool 322. In some examples, the width of the central open area for each second conductive coil 320 (e.g., along the vertical direction) may be approximately twice the width of each second conductive coil 320. Further, as best shown in FIGS. 3 and 5, exterior second conductive coils 320(1) and 320(2) are aligned adjacent to each other, as are interior second conductive coils 320(3), 320(4), and 320(5). Moreover, as seen in FIG. 4, exterior second conductive coils 320(1) and 320(2) are offset from interior second conductive coils 320(3), 320(4), and 320(5) so that a center portion of second conductive coils 320 (e.g., along a vertical center portion of contour 204) substantially cover an entirety of a vertical center portion of contour 204 with little overlap of second conductive coils 320. In other examples, different numbers, sizes, and configurations of second conductive coils 320 may be employed.

FIG. 6 is a perspective view of an exemplary magnet subassembly 600 for employing the Lorentz force for orientation (and possibly translation) purposes. In some examples, magnets 601 with opposing poles facing either other are held within magnet retainers 602 at opposing interior surfaces of a conductive flux carrier 604. Accordingly, a magnetic field is formed between magnets 601, with the remaining magnetic flux being carried within flux carrier 604 to facilitate containment of the magnetic field. Thus, magnets 601 fill a role similar to magnets 101 of FIG. 1.

FIG. 7 is a perspective view of an exemplary combination of exemplary coil subassembly 200 of FIGS. 2-5 and exemplary magnet subassembly 600 of FIG. 6. In some examples, magnets 601 are positioned on either side of contour 204 defining a portion of a spherical surface so that a relatively small area of first conductive coil 210 and at least one second conductive coil 320 lie therebetween. In at least some examples, the magnetic field generated by magnets 601 is directed along a third direction orthogonal to the first and second directions corresponding to first conductive coil 210 and second conductive coils 320 (e.g., normal to contour 204). Moreover, in some embodiments, first conductive coil 210 may serve as first conductive coil 110 of FIG. 1, while second conductive coils 320 may collectively operate as second conductive coil 120 of FIG. 1. Consequently, in response to current flowing in first conductive coil 210, magnet subassembly 600 may move laterally within a range within the vertical central region of contour 204 due to the resulting Lorentz force. Furthermore, in response to current flowing in one or more of second conductive coils 320, magnet subassembly 600 may move vertically along contour 204, as caused by the generated Lorentz force.

Figure 8:
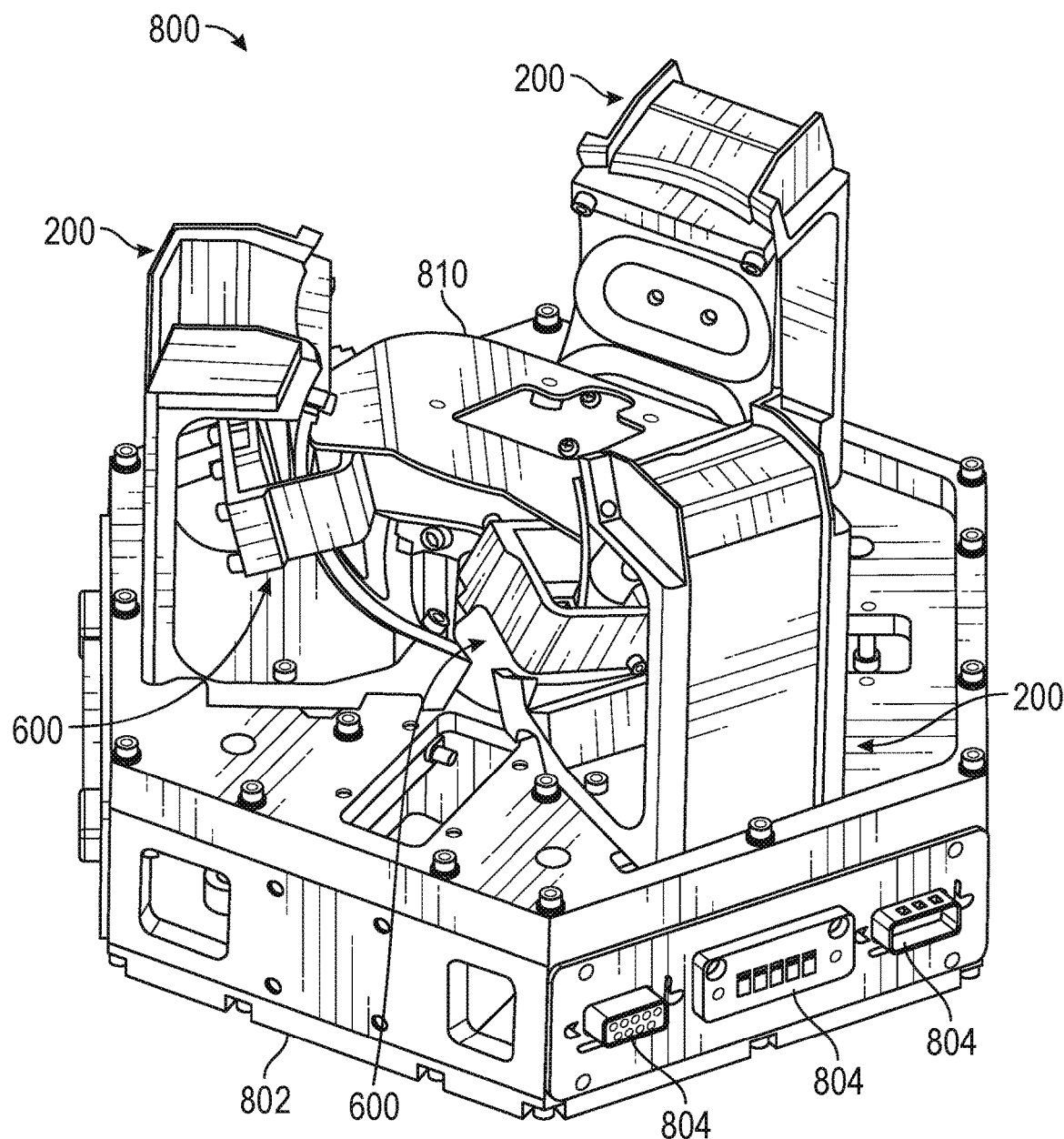
FIG. 8 is a perspective view of a partial exemplary levitating platform including multiple exemplary coil/magnet subassembly combinations of FIG. 7.

In some embodiments, multiple such combinations of coil subassembly 200 and magnet subassembly 600 may be employed to provide movement of an attached platform about two rotational axes to facilitate orientation of the platform. FIG. 8 is a perspective view of a partial exemplary levitating platform 800 including three exemplary coil/magnet subassembly combinations of FIG. 7. However, in other examples, two or more such combinations may be employed to perform other types of movement involving multiple degrees of freedom, translationally and/or rotationally. As depicted in FIG. 8, three coil subassemblies 200 are implemented as part of a stator assembly 802 to fix the relative positions and orientations of coil subassemblies 200. In some examples, such as that shown in FIG. 8, coil subassemblies 200 may be positioned equidistant about stator assembly 802, 120 degrees apart. Other arrangements of coil subassemblies 200 are possible in other embodiments. Moreover, coil subassemblies 200 may be arranged such that contours 204 of coil subassemblies 200 define different portions of the same virtual spherical surface.

Stator assembly 802, in some examples, may be securely attached to a space vehicle or other system. Additionally, in some embodiments, stator assembly 802 may also include one or more connectors 804 for coupling electrical power and/or signals with stator assembly 802. Such signals, in some examples, may include electrical currents for each of coil subassemblies 200. Stator assembly 802 may also include sensors and other devices, as described more fully below in conjunction with FIG. 9.

Each coil subassembly 200 of FIG. 8 may be magnetically coupled with a corresponding magnet subassembly 600, as shown in the combination depicted in FIG. 7. Moreover, magnet subassemblies 600 may be coupled to a platform 810. Accordingly, in response to the Lorentz force movement of magnet subassemblies 600 described above, platform 810 may be rotated in at least two directions: pitch (e.g., elevation, or up and down along a first conductive coil 210) and yaw (e.g., azimuth, or left and right along a second conductive coil 320). In some examples, some measure of rotation about a roll axis, as well as some measure of translation along one or more axes, is also possible. In some other embodiments (e.g., communication beam systems), rotation in the roll direction may not be necessary, as implementing roll may not affect LOS of a beam being received and/or transmitted by a communication device or system.

In some examples, such as that shown in FIG. 8, as well as others not specifically described herein, multiple coil subassemblies 200 and magnet subassemblies 600 may be positioned and employed to provide six degrees of freedom (e.g., translation along and rotation about three independent, orthogonal axes). More specifically, in at least some embodiments, the interaction of coil subassemblies 200 and magnet subassemblies 600 in response to electrical current flowing in the coils of coil subassemblies 200 may provide a significant amount of rotational freedom about two orthogonal axes lying in a plane defined by stator assembly 802 due to the alignment of the coils. Additionally, in some examples, this same coil alignment may facilitate at least some three-axis translation (e.g., along the two orthogonal axes in the plane defined by stator assembly 802, as well as along a third axis orthogonal to that plane), which may be beneficial for maintaining a translational position of platform 810 (e.g., to implement vibration isolation). Moreover, as a result of the interaction of coil subassemblies 200 and magnet subassemblies 600, some amount of rotation of platform 810 about the third axis may also be provided in some examples, thus potentially providing the six degrees of freedom.

While the embodiments of FIG. 8 depict coil subassemblies 200 implemented as portions of stator assembly 802, and multiple magnet subassemblies 600 mechanically coupled to platform 810, other embodiments in which magnet subassemblies 600 are included in stator assembly 802 while coil subassemblies 200 are mechanically coupled to platform 810 to facilitate movement of platform 810 relative to stator assembly 802 are also possible.

Figure 9:
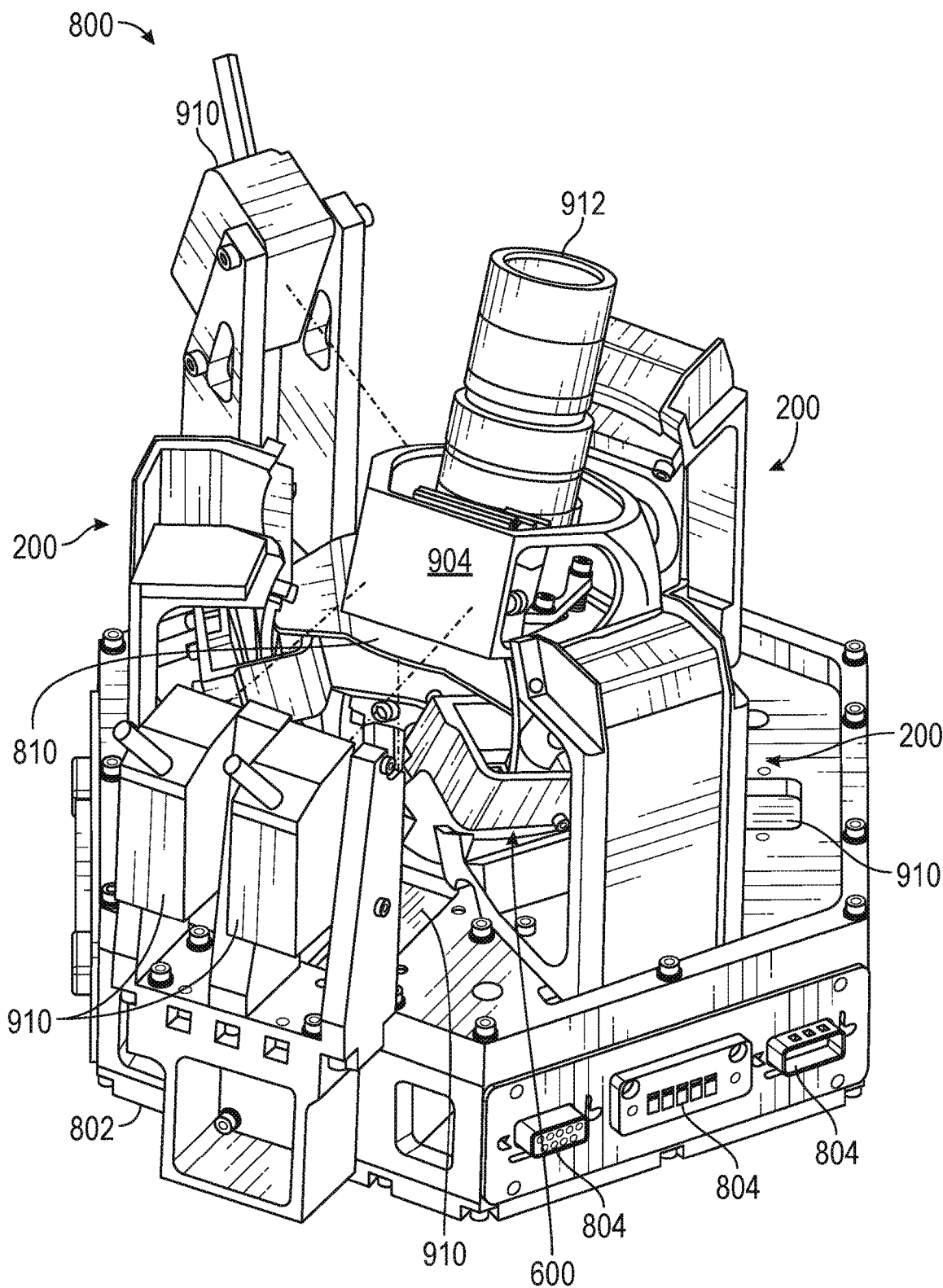
FIG. 9 is a perspective view of a more complete version of the exemplary levitating platform of FIG. 8.

FIG. 9 is a perspective view of a more complete version of exemplary levitating platform 800 of FIG. 8. Levitating platform 800 in this example may include a payload 902 (e.g., in this case, a camera) affixed atop platform 810. In other examples, payload 902 may be an optical beam communication system that receives and/transmits an optical LOS beam carrying information.

Also attached to platform 810 is a sensor reflection structure 904 that may interact with multiple sensors 910 attached to stator assembly 802. In some examples, sensors 910 may be optical (e.g., laser) distance sensors (e.g., optical non-contact displacement transducers, or optoNCDTs, as manufactured by Micro-Epsilon Messtechnk GmbH & Co.), which may be displacement lasers that determine a distance to an object using triangulation of a reflected laser light. However, other types of sensors (e.g., distance, rotational, inertial, and so on) may be employed in other embodiments.

In FIG. 9, sensors 910 may be used to determine the current orientation (e.g., around the pitch and yaw axes) of platform 810 and payload 902, such as by way of determining distances between each sensor 910 and platform 810 and/or sensor reflection structure 904. In the example of FIG. 9, two sensors 910 aligned in parallel may be employed to determine two distinct horizontal distances (e.g., horizontal relative to a top surface of stator assembly 802) to a surface of sensor reflection structure 904. Also, a third sensor 910 may measure a distance to a separate surface of sensor reflection structure 904 at an angle above horizontal (e.g., angled downward toward the top surface of stator assembly 802).

Moreover, in these same examples, three sensors 910 located within stator assembly 802 may be distributed (e.g., equidistant) about stator assembly 802 to measure a vertical distance to platform 810 at three separate points about platform 810. Based on the distance measurements from the six sensors 910, the current orientation and or location of platform 810 and attached payload 902 may be determined.

Figure 10:
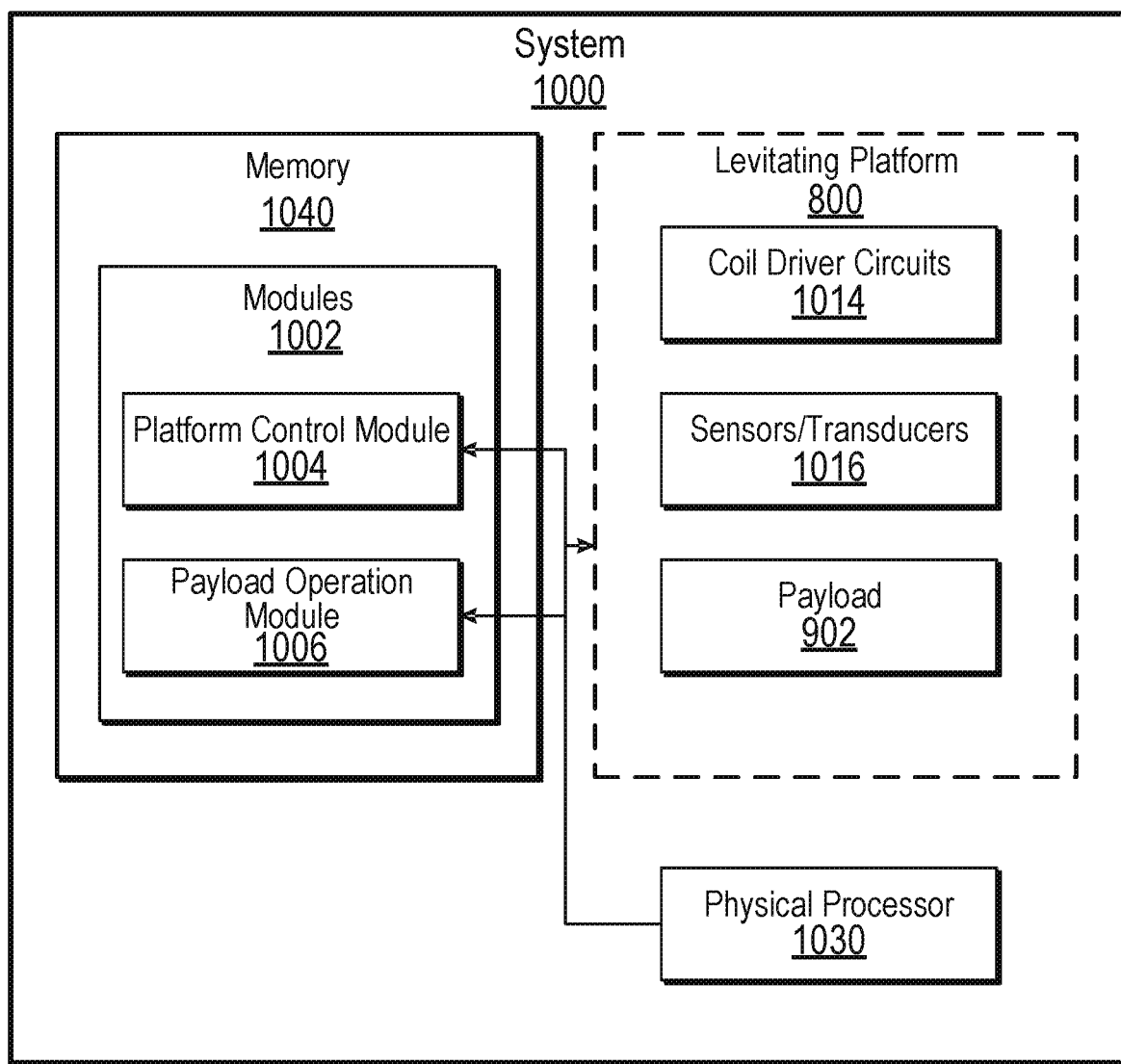
FIG. 10 is a block diagram of an exemplary system including the exemplary levitating platform of FIG. 9.

FIG. 10 is a block diagram of an exemplary system 1000 including levitating platform 900 of FIG. 9. As illustrated in FIG. 10, system 1000 may include one or more modules 1002 for performing one or more tasks. As will be explained in greater detail below, modules 1002 may include a platform control module 1004 and a payload operation module 1006. Although illustrated as separate elements, one or more of modules 1002 in FIG. 10 may represent portions of a single module or application.

In the example embodiments described in greater detail below, system 1000 may be employed as at least a portion of a communication satellite or vehicle that employs one or more levitating platforms 800 and associated payloads 902 for communicating wirelessly with other communication devices, such as an optical beam communication system. Further, as illustrated in FIG. 10, levitating platform 800 may include coil driver circuits 1014, sensors/transducers 1016, and payload 902. In some embodiments, coil driver circuits 1014 may receive one or more signals from platform control module 1004 and deliver electrical current to one or more conductive coils (e.g., first conductive coils 210 and/or second conductive coils 320 of coil subassemblies 200) to generate Lorentz forces to rotate (as well as possibly translate) payload 902, as discussed earlier, as well as to maintain physical isolation (e.g., via levitation) between a rotor assembly that includes magnet subassembly 600, platform 810, and payload 902 from the remainder of the system (e.g., coil subassemblies 200). Sensors/transducers 1016 (e.g., sensors 910) may provide signals to platform control module 1004 indicating a current rotational and/or translational position of payload 902 to facilitate rotational and/or translational control of payload 902 by platform control module 1004. In some examples, coil driver circuits 1014 and/or sensors/transducers 1016 may be a part of stator assembly 802, or may be located exterior to stator assembly 802.

Regarding modules 1002, platform control module 1004, in some examples, may receive the position signals (as well as other signals indicating a current state of levitating platform 900 and/or payload 902, including inertial and/or gyroscopic information) from sensors/transducers 1016, determine the current rotational position (and possibly other aspects) of payload 902, and, based on that information, generate signals to be provided to coil driver circuits 1014 to position payload 902 as desired. In some embodiments, platform control module 1004 may receive information from the vehicle or other system (e.g., sensor information) upon which platform control module 1004 may base the signals being provided to coil driver circuits 1014.

Payload operation module 1006, in some embodiments, may generate and/or receive signals to payload 902 to facilitate operation of payload 902. For examples in which payload 902 is a communication system, payload operation module 1006 may generate outgoing communication data to be transmitted using payload 902, and/or may collect and/or process incoming communication data received via payload 902. In some examples, payload operation module 1006 may also receive and/or generate additional information regarding the operation of payload 902, such as control and/or status information (e.g., received signal strength information, error or fault conditions generated by payload 902, and so on) and generate signals for either or both of payload 902 and coil driver circuits 1014 based on that information. In some embodiments, payload operation module 1006 may receive other information (e.g., positioning and attitude information for the vehicle and/or another communication system) upon which the signals for payload 902 and/or coil driver circuits 1014 may be based.

In certain embodiments, one or more of modules 1002 in FIG. 10 may represent one or more software applications or programs that, when executed by a computing device, may cause the computing device to perform one or more tasks. One or more of modules 1002 in FIG. 10 may also represent all or portions of one or more special-purpose computers configured to perform one or more tasks. Additionally, in some embodiments, one or more of modules 1002 may include special-purpose hardware for performing some of the tasks ascribed to modules 1002.

As illustrated in FIG. 10, example system 1000 may also include one or more memory devices, such as memory 1040. Memory 1040 generally represents any type or form of volatile or non-volatile storage device or medium capable of storing data and/or computer-readable instructions. In one example, memory 1040 may store, load, and/or maintain one or more of modules 1002. As illustrated in FIG. 10, example system 1000 may also include one or more physical processors, such as physical processor 1030, that may access and/or modify one or more of modules 1002 stored in memory 940. Additionally or alternatively, physical processor 1030 may execute one or more of modules 1002. In yet other example embodiments, one or more of modules 1002, or portions thereof, instead may be implemented as hardware components not stored in memory 1040, such as electronic circuitry for performing one or more tasks described above.

Figure 11:
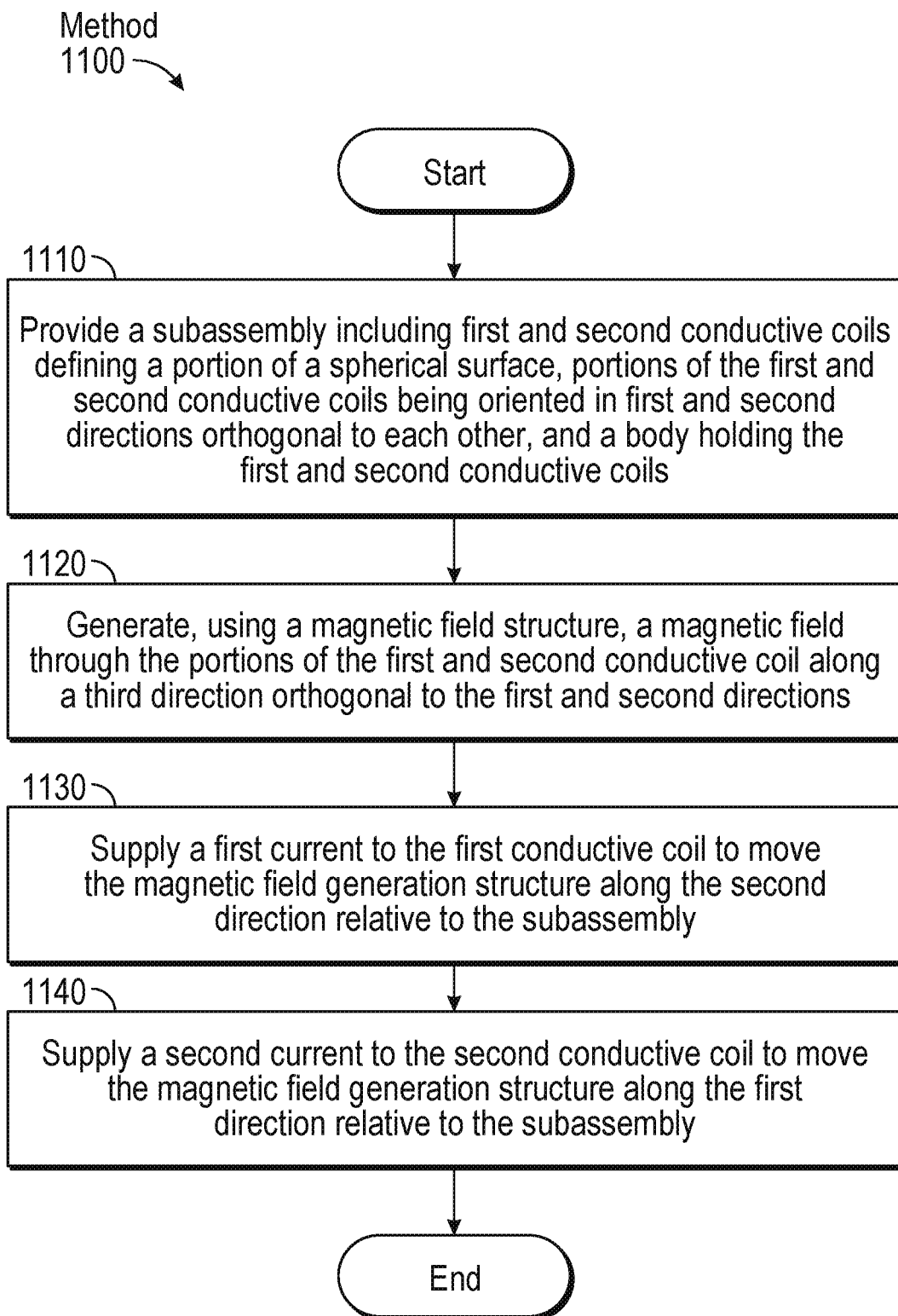
FIG. 11 is a flow diagram of an exemplary method employing the Lorentz force using a coil subassembly.

FIG. 11 is a flow diagram of an exemplary method 1100 employing the Lorentz force using a coil subassembly (e.g., coil subassembly 200). In method 1100, at step 1110, a subassembly may be provided that includes a first conductive coil (e.g., first conductive coil 210) and a second conductive coil (e.g., second conductive coil 320). In some examples, the first and second conductive coils may be wound on, or otherwise attached to, a body so that the relative positions and orientations of the coils remains fixed. At least a portion of the first conductive coil and the second conductive coil may define a portion of a spherical surface, where at least a portion of the first conductive coil is oriented along a first direction of the portion of the spherical surface, and at least a portion of the second conductive coil is oriented along a second direction along the portion of the spherical surface and is orthogonal to the first direction.

At step 1120, a magnetic field may be generated (e.g., using magnet subassembly 600) through the portions of the first and second conductive coils along a third direction orthogonal to the first and second directions. In some examples, the third direction is substantially normal to the portion of the spherical surface. At step 1130, a first current may be supplied to the first conductive coil to move a magnetic field generation structure (e.g., magnet subassembly 600) along the second direction relative to the subassembly. At step 1140, a second current may be supplied to the second conductive coil to move the magnetic field generation structure along the first direction relative to the subassembly. In some examples, platform control module 1004 may perform steps 1130 and/or 1140.

Figure 12:
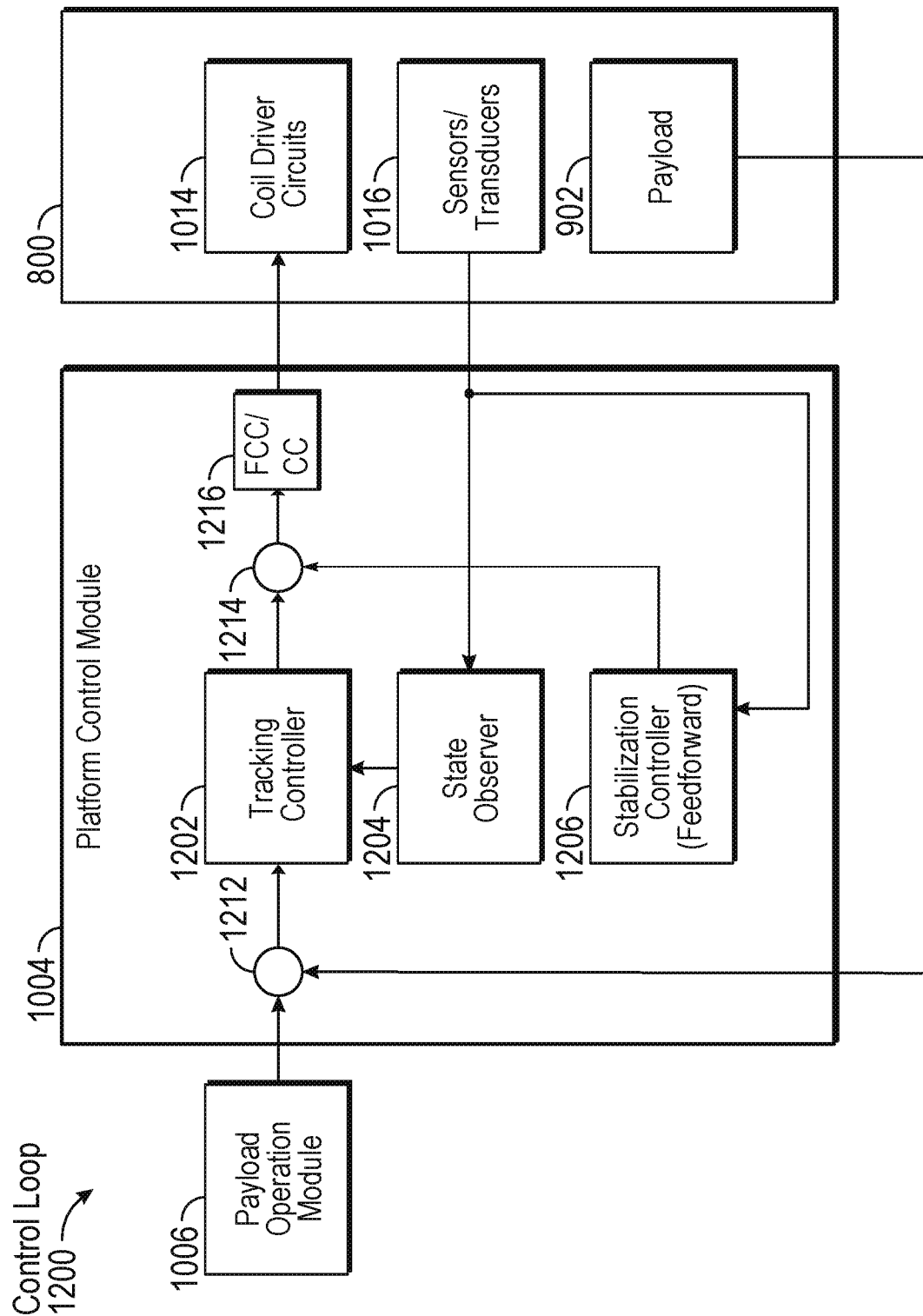
FIG. 12 is a block diagram of an exemplary control loop for operating the exemplary levitating platform of FIG. 9.

FIG. 12 is a block diagram of an exemplary control loop 1200 for operating a levitating platform (e.g., levitating platform 900 of FIG. 9). Control loop 1200, in some examples, may be implemented using one or more of payload operation module 1006, platform control module 1004, coil driver circuits 1014, sensors/transducers 1016, and/or payload 902. As shown, control loop 1200 may implement one or both of a feedback loop (e.g., using a first signal combiner 1212) and a feedforward loop (e.g., using a second signal combiner 1214). In some embodiments, signal combiners 1212 and 1214 may generate a difference or error signal between input signals. However, other types of signal combiners may be employed in other examples. In some embodiments, the feedback loop may receive a signal indicating a signal from payload operation module 1006 indicating an expected or intended value to be received from payload 902, such as an expected status signal (e.g., an expected received signal strength indicator value, an expected attitude value, etc.), and subtract or otherwise compare an actual status signal from payload 902 to generated an error or difference signal for a tracking controller 1202 of platform control module 1004.

Tracking controller 1202, in some examples, may implement any type of control strategy or functionality for use in generating electrical current for first conductive coil 210 and second conductive coils 320 via coil driver circuits 1014. One example of tracking controller 1202 may be a proportional-integral-derivative (PID) controller, but many other types of tracking controller 1202 may be employed in control loop 1200.

In addition, in some embodiments, platform control module 1004 may include a state observer 1204 that may determine a current state of levitating platform 800 based on signals received from sensors/transducers 1016, discussed above. State observer 1204, for example, may determine a current orientation and/or position of payload 902, a rotational velocity of payload 902, and so on based on measurements and other status information regarding levitating platform 800 and/or the vehicle in which levitating platform 800 may be carried. Based on the error or difference information and/or the current state of levitating platform 800, tracking controller 1202 may generate signals to drive coil driver circuits 1014 to control the movement of payload 902.

In some examples, the one or more signals generated by tracking controller 1202 may be compared against one or more signals generated by a stabilization controller 1206 in the feedforward loop mentioned above. Stabilization controller 1206, in some embodiments, may receive the same or similar information from sensors/transducers 1016 indicating a current state of levitating platform 800, payload 902, and/or the vehicle and process that information to provide stabilization of levitating platform 800. Signal combiner 1214 may subtract signals from stabilization controller 1206 from the output signals of tracking controller 1206, or otherwise combine these signals, to generate signals for a force constant compensation and coil commutation (FCC/CC) block 1216. In some examples, FCC/CC block 1216 modifies the inputs received from signal combiner 1214 to address unit-to-unit gain variation (e.g., gain variations from one levitating platform 800 to another) to provide force constant compensation for this specific levitating platform 800. In some embodiments, such gain variations may be related to the temperature of first conductive coils 210 and/or second conductive coils 320(1)-320(5). Also, in some examples, these gain variations may be characterized for each instance of levitating platform 800 during or after the manufacturing process. FCC/CC block 1216, in some embodiments, may also provide coil commutation (e.g., turning the electrical current to each of the second conductive coils 320 on and off at desired times) depending on the current location and direction of travel of corresponding magnetic subassembly 600 relative to each second conductive coil 320(1)-320(5), as well as possibly on other factors. A more detailed discussion regarding an example of coil commutation is presented below in reference to FIG. 13. The output of FCC/CC block 1216 is ultimately employed by coil driver circuits 1014 to operate levitating platform 800 to move payload 902 about using the Lorentz forces described above.

In some embodiments, the feedback loop through signal combiner 1212 may be employed primarily to control levitating platform 800 to ensure acceptable LOS tracking of payload 902 relative to some reference point (e.g., a ground-based or orbiting communication system). The feedforward loop through signal combiner 1214, in comparison, may provide highly-responsive platform stabilization (e.g., maintaining proper orientation of payload 902, maintaining physical isolation of the payload 902 and other portions of the rotor assembly from stator assembly 802 and other components, etc.) in view of vehicle vibrations and/or other system perturbations. However, many other types of control loops providing feedback and/or feedforward loops may be employed in conjunction with levitating platform 800 in other embodiments.

Figure 13:
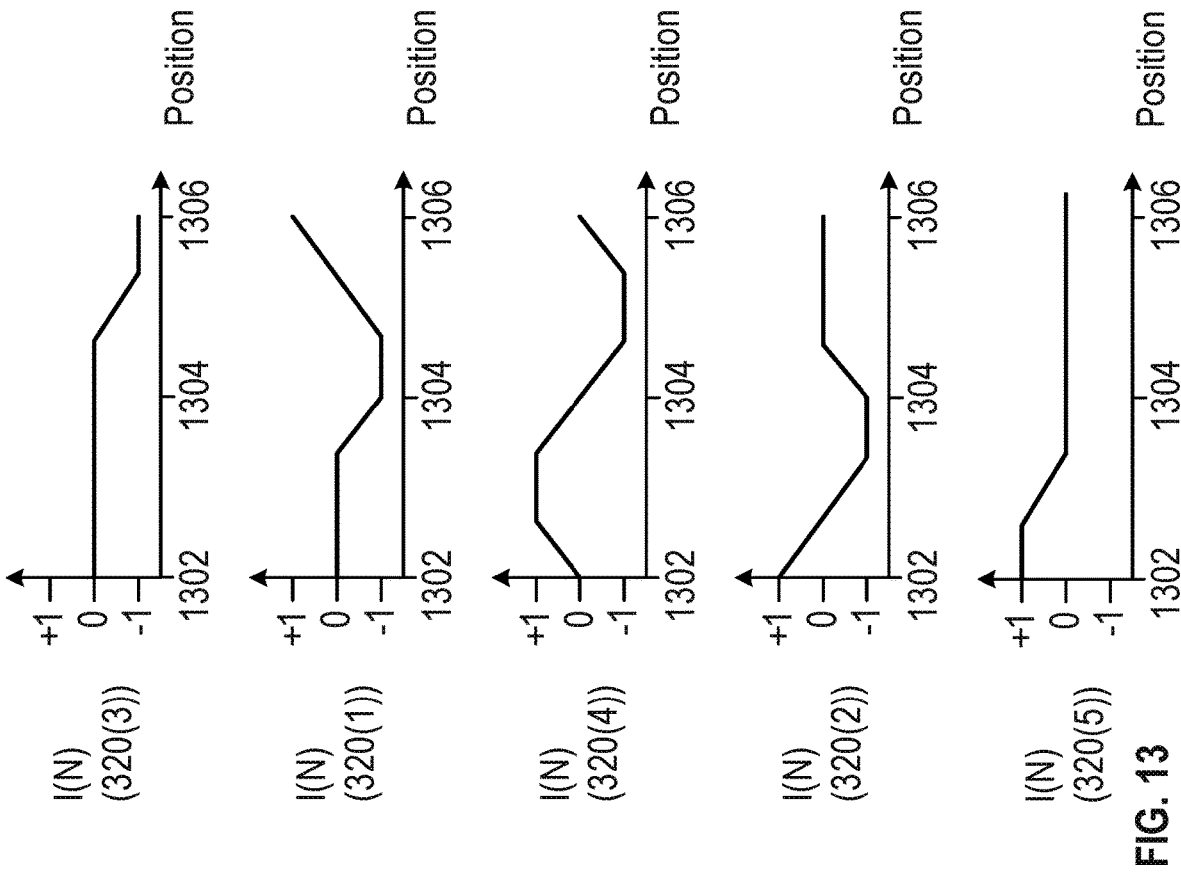
FIG. 13 is a cross-sectional view of coils of the exemplary coil subassembly of FIG. 2 and associated electrical current graphs of an exemplary control example.
Figure 13:
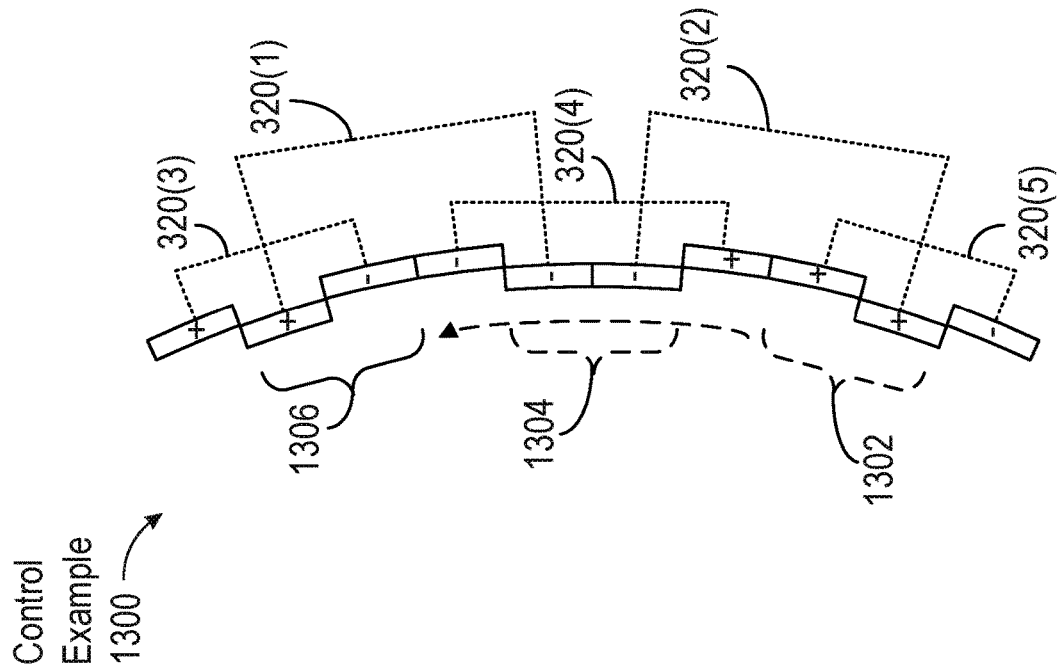

FIG. 13 provides a cross-sectional view of second conductive coils 320(1)-320(5), along with a current graph for each second conductive coil 320(1)-320(5) associated with a particular control example 1300. First conductive coil 210 is not depicted to simplify FIG. 13 and the related discussion hereafter. In control example 1300, magnetic subassembly 600 (also not depicted in FIG. 13) is initially located at position 1302, and is moved upward through position 1304 to position 1306 by way of a Lorentz force by way of electrical current flowing in second conductive coils 320(1)-320(5). In some embodiments, magnets 601 of magnetic subassembly 600 may be sized and positioned such that the magnetic field interacts at any particular time with current flowing through two-to-three of second conductive coils 320(1)-320(5) positioned between magnets 601 to produce the desired movement of magnetic subassembly 600 relative to coil subassembly 200.

As depicted in FIG. 13, each half or branch of each second conductive coil 320(1)-320(5) is marked with an orientation (e.g., '+' or '−') to indicate that a positive electrical current, as indicated in the current graphs of FIG. 13 for each second conductive coil 320(1)-320(5), may flow outward (e.g., toward the reader) of the '+' branch and into (e.g., away from the reader) of the '−' branch of that second conductive coil 320(1)-320(5). Consequently, in the presence of a magnetic field generally directed from left to right through a second conductive coil 320(1)-320(5), as generated by magnets 601, a positive electrical current flowing in a second conductive coil 320(1)-320(5) may produce an upwardly-directed Lorentz force on magnetic subassembly 600 when magnetic subassembly 600 is positioned at the '+' branch of second conductive coil 320(1)-320(5), and may cause a downwardly-directed Lorentz force on magnetic subassembly 600 when magnetic subassembly 600 is positioned at the '−' branch of second conductive coil 320(1)-320(5). Accordingly, negative electrical current flowing in a second conductive coil 320(1)-320(5) will provide the opposite direction of Lorentz force on magnetic subassembly 600 when magnetic subassembly 600 is positioned at the corresponding branch of second conductive coil 320(1)-320(5). In some embodiments, such as those described herein, second conductive coils 320(1)-320(5) are positioned such that only one branch of any particular second conductive coil 320(1)-320(5) is located in the magnetic field produced between magnets 601 at any particular time such that electrical current flowing in any single second conductive coil 320(1)-320(5) does not apply opposing Lorentz forces on magnetic subassembly 600 at any point in time. Also, in some embodiments, second conductive coils 320(1) and 320(2) may be wound in opposite directions (e.g., as indicated in FIG. 13), which may allow the use of a common interface to supply current to both of these second conductive coils 320(1) and 320(2).

Based on the foregoing, movement of magnetic subassembly 600 from position 1302 through position 1304 to position 1306 by employing a substantially upward-directed Lorentz force may be accomplished, in some examples, by applying the normalized electrical currents (I(NN) in each second conductive coil 320(1)-320(5), as illustrated in FIG. 13. More specifically, in some examples, as magnets 601 begin to encounter a '+' branch of a second conductive coil 302 (e.g., second conductive coil 302(4) when leaving position 1302), normalized electrical current (I(N)) may increase from zero toward one. Oppositely, as magnets 601 begin to leave a '+' branch of a second conductive coil (e.g., second conductive coil 320(2) when leaving position 1302), normalized electrical current I(N) may drop from one toward zero. Correspondingly, entering and leaving '−' branches of second conductive coils 302(1)-302(5), in some examples, may involve normalized currents I(N) transitioning between zero and negative one, as shown in the graphs. In some embodiments, a system (e.g., system 1000) may implement a control loop (e.g., control loop 1200) capable of coordinating the magnitude and polarity of the different electrical currents I(N) for each second conductive coil 320(1)-320(5) (e.g., as a form of commutation) to move magnetic subassembly 600. Further, in some examples, the position of multiple such magnetic subassemblies 600, as well as attached platform 810, may be altered and/or maintained (e.g., for levitation control) in response to such electrical currents in corresponding second conductive coils 320(1)-320(5) (as well as electrical currents in first conductive coils 210).

As explained above in conjunction with FIGS. 1 through 12, the coil and magnet subassemblies described herein, as well as the systems and methods employing such assemblies, may facilitate movement of a platform carrying a device or system, such as an optical communication system that is sensitive to perturbing motions (e.g., mechanical vibrations) normally present in the environment (e.g., a space vehicle) in which the device or system operates. Such movement may be primarily rotational in nature (e.g., providing two degrees of freedom, such as about pitch and yaw axes), or may be both translational and rotational (e.g., providing up to six degrees of freedom). Additionally, such apparatuses, systems, and methods may provide exceptional accuracy (e.g., in terms of nanoradians and/or microns) while simultaneous facilitating large overall ranges of motion (e.g., over several degrees of rotation or centimeters of translation). Moreover, such systems may be implemented in a variety of environments (e.g., varying orbital and/or terrestrial vehicles) for numerous different types of payloads. Furthermore, use of various embodiments described herein may eliminate a need for some hardware (e.g., a large mirror for directing an optical beam in a desired direction) employed in current operational environments.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive sensor and/or transducer data to be transformed, transform the sensor and/or transducer data, and output a result of the transformation to operate a levitating platform (e.g., rotate and/or translate a payload coupled to the levitating platform), as discussed in detail above. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. An apparatus comprising:
    a subassembly comprising:
        a first conductive coil, wherein at least a portion of the first conductive coil defines a portion of a spherical surface, and wherein the portion of the first conductive coil is oriented along a first direction along the portion of the spherical surface;
        a second conductive coil proximate the first conductive coil, wherein at least a portion of the second conductive coil is oriented along a second direction along the portion of the spherical surface, and wherein the second direction is orthogonal to the first direction; and
        a body that holds the first conductive coil and the second conductive coil;
    a magnetic field generation structure that generates a magnetic field through the portion of the first conductive coil and the portion of the second conductive coil, wherein the magnetic field is directed along a third direction orthogonal to the first direction and the second direction; and
    a coil driver circuit that:
        supplies first current to the first conductive coil to move the magnetic field generation structure along the second direction relative to the subassembly and supplies second current to the second conductive coil to move the magnetic field generation structure along the first direction relative to the subassembly; or
        supplies first current to the first conductive coil to move the subassembly along the second direction relative to the magnetic field generation structure and supplies second current to the second conductive coil to move the subassembly along the first direction relative to the magnetic field generation structure.

2. The apparatus of claim 1, wherein:
    the body comprises a section defining the portion of the spherical surface; and
    the first conductive coil is at least partially routed over the section on an exterior of the body.

3. The apparatus of claim 2, wherein the second conductive coil is routed over the section on an interior of the body.

4. The apparatus of claim 3, wherein the subassembly further comprises a third conductive coil that is routed over the section at the exterior of the body, and wherein at least a portion of the third conductive coil is oriented along the second direction.

5. The apparatus of claim 4, wherein the second conductive coil and the third conductive coil each define a central open area, wherein the second conductive coil at least partially overlaps the central open area of the third conductive coil, and wherein the third conductive coil at least partially overlaps the central open area of the second conductive coil.

6. The apparatus of claim 5, wherein the subassembly further comprises a fourth conductive coil that is routed over the section at the exterior of the body, is located proximate the third conductive coil, and defines a central open area, wherein the second conductive coil at least partially overlaps the central open area of the fourth conductive coil, and wherein the fourth conductive coil at least partially overlaps the central open area of the second conductive coil.

7. The apparatus of claim 3, wherein the subassembly further comprises a third conductive coil proximate the second conductive coil, wherein the third conductive coil is routed over the section on the interior of the body, and wherein at least a portion of the third conductive coil is oriented along the second direction.

8. The apparatus of claim 2, wherein the second conductive coil is routed over the section at the exterior of the body over the first conductive coil.

9. The apparatus of claim 8, wherein the subassembly further comprises a separator comprising a contour matching the section of the body, wherein the separator is coupled to the body over the first conductive coil, and wherein the second conductive coil is routed atop the separator opposite the first conductive coil.

10. The apparatus of claim 8, wherein the subassembly further comprises a third conductive coil proximate the second conductive coil, wherein the third conductive coil is routed over the section at the exterior of the body over the first conductive coil, and wherein at least a portion of the third conductive coil is oriented along the second direction.

11. The apparatus of claim 2, wherein the magnetic field generation structure comprises:
a first magnet located proximate the section of the body external to the body; and
a second magnet located proximate the section of the body internal to the body.

12. The apparatus of claim 11, wherein the magnetic field generation structure further comprises a flux carrier carrying the first magnet and the second magnet, wherein the flux carrier surrounds the section of the body.

13. A system comprising:
a plurality of subassemblies, wherein each subassembly comprises:
a first conductive coil, wherein at least a portion of the first conductive coil defines a portion of a spherical surface, and wherein the portion of the first conductive coil is oriented along a first direction along the portion of the spherical surface;
a second conductive coil proximate the first conductive coil, wherein at least a portion of the second conductive coil is oriented along a second direction along the portion of the spherical surface, and wherein the second direction is orthogonal to the first direction; and
a body that holds the first conductive coil and the second conductive coil;
for each subassembly, a magnetic field generation structure that generates a magnetic field through the portion of the first conductive coil and the portion of the second conductive coil, wherein the magnetic field is directed along a third direction orthogonal to the first direction and the second direction;
a stator assembly comprising a base and:
the plurality of subassemblies, wherein the body of each of the plurality of subassemblies is connected to the base; or
the magnetic field generation structures, wherein each of the magnetic field generation structures is connected to the base;
a rotor assembly comprising:
the plurality of subassemblies, wherein the body of each of the plurality of subassemblies is connected to the platform; or
the magnetic field generations structures, wherein each of the magnetic field generation structures is connected to the platform; and
a coil driver circuit that, for each subassembly:
supplies first current to the first conductive coil to move a corresponding magnetic field generation structure along the second direction relative to the subassembly and
supplies second current to the second conductive coil to move the corresponding magnetic field generation structure along the first direction relative to the subassembly; or
supplies first current to the first conductive coil to move the subassembly along the second direction relative to a corresponding magnetic field generation structure and
supplies second current to the second conductive coil to move the subassembly along the first direction relative to the corresponding magnetic field generation structure.

14. The system of claim 13, wherein at least one of the magnetic field generation structures or the plurality of subassemblies are positioned equidistant about the platform.

15. The system of claim 13, wherein the system comprises three of the subassemblies and three of the magnetic field generation structures.

16. The system of claim 13, further comprising:
at least one position sensor that generates position information that indicates a position of the platform relative to the stator assembly; and
a control subsystem that causes the coil driver circuit to supply at least one of the first current or the second current for at least one of the plurality of subassemblies based on the position information.

17. The system of claim 16, wherein the control subsystem causes the coil driver circuit to supply the at least one of the first current or the second current for the at least one of the plurality of subassemblies to maintain an orientation of the platform toward a reference area independent of an orientation of the stator assembly.

18. The system of claim 13, further comprising a payload connected to the platform.

19. The system of claim 18, wherein the payload comprises a communication device.

20. A method comprising:
providing a subassembly comprising:
a first conductive coil, wherein at least a portion of the first conductive coil defines a portion of a spherical surface, and wherein the portion of the first conductive coil is oriented along a first direction along the portion of the spherical surface;
a second conductive coil proximate the first conductive coil, wherein at least a portion of the second conductive coil is oriented along a second direction along the portion of the spherical surface, and wherein the second direction is orthogonal to the first direction; and
a body that holds the first conductive coil and the second conductive coil;

generating, using a magnetic field generation structure, a magnetic field through the portion of the first conductive coil and the portion of the second conductive coil, wherein the magnetic field is directed along a third direction orthogonal to the first direction and the second direction;

supplying a first current to the first conductive coil:
to move the magnetic field generation structure along the second direction relative to the subassembly; or
to move the subassembly along the second direction relative to the magnetic field generation structure; and supplying a second current to the second conductive coil:
to move the magnetic field generation structure along the first direction relative to the subassembly; or
to move the subassembly along the first direction relative to the magnetic field generation structure.

* * * * *